United States Patent
Sha et al.

(10) Patent No.: US 7,259,796 B2
(45) Date of Patent: Aug. 21, 2007

(54) SYSTEM AND METHOD FOR RAPIDLY SCALING AND FILTERING VIDEO DATA

(75) Inventors: Li Sha, San Jose, CA (US); Qifan Huang, Sunnyvale, CA (US)

(73) Assignee: Micronas USA, Inc., Santa Clara, CA (US)

( * ) Notice: Subject to any disclaimer, the term of this patent is extended or adjusted under 35 U.S.C. 154(b) by 150 days.

(21) Appl. No.: 10/966,058

(22) Filed: Oct. 14, 2004

(65) Prior Publication Data

US 2005/0248589 A1 Nov. 10, 2005

Related U.S. Application Data

(60) Provisional application No. 60/568,892, filed on May 7, 2004.

(51) Int. Cl.
*H04N 7/01* (2006.01)
*H04N 1/393* (2006.01)

(52) U.S. Cl. .............. 348/581; 348/441; 348/561; 382/298; 345/660

(58) Field of Classification Search .......... 348/581, 348/441, 708, 445, 704, 561; 382/298, 260; 345/660, 667; 702/197, 190; 358/451
See application file for complete search history.

(56) References Cited

U.S. PATENT DOCUMENTS

| | | | |
|---|---|---|---|
| 5,384,912 A | | 1/1995 | Ogrinc et al. |
| 5,422,827 A | * | 6/1995 | Niehaus ............ 702/190 |
| 5,809,182 A | * | 9/1998 | Ward et al. ............ 382/298 |
| 6,075,906 A | | 6/2000 | Fenwick et al. |
| 6,108,047 A | * | 8/2000 | Chen ............ 348/581 |
| 6,177,922 B1 | | 1/2001 | Schiefer et al. |
| 6,281,873 B1 | | 8/2001 | Oakley |
| 6,347,154 B1 | | 2/2002 | Karanovic et al. |
| 6,563,544 B1 | * | 5/2003 | Vasquez ............ 348/447 |
| 6,618,445 B1 | | 9/2003 | Peng et al. |
| 6,661,427 B1 | * | 12/2003 | MacInnis et al. ........ 345/660 |
| 6,690,427 B2 | * | 2/2004 | Swan ............ 348/448 |
| 6,738,072 B1 | * | 5/2004 | MacInnis et al. ........ 345/629 |
| 6,937,291 B1 | * | 8/2005 | Gryskiewicz ............ 348/581 |

(Continued)

OTHER PUBLICATIONS

"AVC/MPEG High-Definition Decoder", Broadcom Corporation [online] [Retrieved on Sep. 7, 2005]. Retrieved from the Internet: <URL: http://www.broadcom.com/products/Cable/HDTV-SDTV-Video,-Graphics-%26-Receiver-Chips/BCM7411>. 2 pages.

(Continued)

*Primary Examiner*—David Ometz
*Assistant Examiner*—Jean W. Désir
(74) *Attorney, Agent, or Firm*—Michael A. Molano; Mayer, Brown, Rowe & Maw LLP

(57) ABSTRACT

This invention relates generally to hardware for scaling and filtering video data and more specifically to algorithms and techniques for accelerating scaling and filtering operations on digital video data. The hardware is designed so that scaling and filtering operations are combined and performed simultaneously where possible to speed manipulation of the video data. Efficient design of the system allows memory buffers and logic gates to be shared or eliminated to reduce the size, cost and power requirements of the hardware implementation.

9 Claims, 11 Drawing Sheets

U.S. PATENT DOCUMENTS

| | | |
|---|---|---|
| 2001/0046260 A1 | 11/2001 | Molloy |
| 2001/0052944 A1 | 12/2001 | Kim |
| 2002/0168010 A1 | 11/2002 | Ali |
| 2003/0007562 A1 | 1/2003 | Kerofsky et al. |
| 2003/0012276 A1 | 1/2003 | Zhong et al. |
| 2003/0080981 A1* | 5/2003 | Lin et al. ............... 345/660 |
| 2003/0095711 A1 | 5/2003 | McGuinness et al. |
| 2003/0138045 A1 | 7/2003 | Murdock et al. |
| 2003/0156650 A1 | 8/2003 | Campisano et al. |
| 2003/0198399 A1 | 10/2003 | Atkins |
| 2004/0010479 A1 | 1/2004 | Ali |
| 2004/0085233 A1 | 5/2004 | Linzer et al. |
| 2004/0240559 A1 | 12/2004 | Prakasam et al. |
| 2004/0260739 A1 | 12/2004 | Schumann |
| 2004/0263361 A1 | 12/2004 | Pearson et al. |
| 2005/0001745 A1 | 1/2005 | Sankaran |

OTHER PUBLICATIONS

"BCM7411 Product Brief", Broadcom Corporation [online][Retrieved on Dec. 8, 2005]Retrieved from the Internet: <URL: http://www.broadcom.com/collateral/pb/7411-PB05-R.pdf>. 2 pages.

"Broadcom Announces High Definition TV Decoder Reference Design Platform Featuring H.264 Advanced Video Compression", Broadcom Corporation [online] [Retrieved on Sep. 7, 2005]. Retrieved from the Internet: <URL: http://www.broadcom.com/press/release.php?id=660337. 4 pages.

Burger, Douglas et al., "Memory Systems", The Computer Science and Engineering Handbook, Ed. Allen B. Tucker, 1997, pp. 447-461, CRC Press, Boca Raton, FL.

"Differential Motion Vectors" [online] [Retrieved on Oct. 14, 2002] Retrieved from the Internet: <URL: http://www.cmlab.csie.ntu.edu.tw/cml/dsp/training/coding/h263/motion.html>. 2 pages.

"Dual Channel AVC High-Definition Reference Platform". Broadcom Corporation [online] [Retrieved on Dec. 14, 2005] Retrieved from the Internet: <URL: http://www.broadcom.com/collateral/pb/97395-PB00-R.pdf>. 2 pages.

"Dual High-Definition Digital Video System-on-Chip Solution for Cable, Satellite, and DTV", Broadcom Corporation [online][Retrieved on Dec. 14, 2005]. Retrieved from the Internet: <URL: http://www.broadcom.com/collateral/pb/7038-PB01-R.pdf>. 2 pages.

"EM8400", Sigma Designs [online] Jan. 9, 2003 [Retrieved on Dec. 8, 2005] Retrieved from the Internet: <URL: http://www.sigmadesigns.com/pdf_docs/em8400brochure.pdf>. 2 pages.

"EM8470", Sigma Designs [online] Mar. 20, 2003 [Retrieved on Dec. 8, 2005] Retrieved from the Internet: <URL: http://www.sigmadesigns.com/pdf_docs/em847xbrochure.pdf>. 2 pages.

"EM8485", Sigma Designs [online] Apr. 30, 2003 [Retrieved on Sep. 7, 2005] Retrieved from the Internet: <URL: http://www.sigmadesigns.com/pdf_docs/EM8485brochure.pdf>. 2 pages.

"EM8500", Sigma Designs [online] Jan. 16, 2004 [Retrieved on Dec. 8, 2005] Retrieved from the Internet: <URL: http://www.sigmadesigns.com/pdf_docs/em8500_brochure.pdf>. 2 pages.

"EM8610", Sigma Designs [online] Jan. 13, 2004 [Retrieved on Dec. 8, 2005] Retrieved from the Internet: <URL: http://www.sigmadesigns.com/pdf_docs/em8610_brochure.pdf>. 2 pages.

"EM8610L", Sigma Designs [online] Aug. 2005 [Retrieved on Dec. 8, 2005] Retrieved from the Internet: <URL: http://www.sigmadesigns.com/pdf_docs/EM8610LSeries_br.pdf>. 2 pages.

"H.264 Advanced Video Coding: A Whirlwind Tour", PixelTools, [online] [Retrieved on Sep. 7, 2005] Retrieved from the Internet: <URL: http://www.pixeltools.com/h264_paper.html>. 8 pages.

"H.264/MPEG-4 Part 10 Advanced Video Coding", Moonlight Technology, [online] [Retrieved on Sep. 7, 2005] Retrieved from the Internet: <URL: http://www.moonlight.com.il/technology/h264/>. 2 pages.

"H.264 Video Decoder for HDTV", Sci-Worx [online] [Retrieved on Sep. 7, 2005] Retrieved from the Internet: <URL: http://www.sci-worx.com/uploads/media/H264VD.pdf>. 2 pages.

"ITU-T H.264—Series H: Audiovisual and Multimedia Systems Infrastructure of Audiovisual Services—Coding of Moving Video", International Telecommunication Union, Mar. 2005, pp. xiii-330.

"MPEG-4 AVC/H.264 Video Decoder", Conexant Systems, Inc. [online] [Retrieved on Dec. 8, 2005] Retrieved from the Internet: <URL: http://www.conexant.com/servlets/DownloadServlet/102551A.pdf?FileId=1870>. 2 pages.

Schafer, Ralf et al., "The Emerging H.264/AVC Standard", EBU Technical Review, Jan. 2003, 12 pages.

Tourapis, Alexis M. et al., "Motion Vector Prediction With Reference Frame Consideration", 8 pages.

"Video DSP", TechnoWorld, Sony Corporation [online] [Retrieved on Dec. 8, 2005] Retrieved from the Internet: <URL: http://www.sony.net/Products/SC-HP/cx_news/vol13/pdf/tw_dsp.pdf>. 4 pages.

Wiegand, Thomas, "Context-Based Adaptive Coding and the Emerging H.26L Video Compression Standard", 27 pages, Heinrich Hertz Institute, Berlin, Germany.

International Search Report and Written Opinion issued on Sep. 18, 2006 for PCT/International Application No. PCT/US05/15275.

* cited by examiner

| 0 | 0 | 0 | 0 | 1 | 0 | -1 | 0 | 0 | 0 | 0 | 0 |
|---|---|---|---|---|---|---|---|---|---|---|---|

110

Edge finder

Figure 8a

| 0 | 0 | 0 | 1/5 | 1/5 | 1/5 | 1/5 | 1/5 | 0 | 0 | 0 | 0 |
|---|---|---|---|---|---|---|---|---|---|---|---|

110

Box filter

Figure 8b

| 0 | 0 | 1/16 | 2/16 | 3/16 | 4/16 | 3/16 | 2/16 | 1/16 | 0 | 0 | 0 |
|---|---|---|---|---|---|---|---|---|---|---|---|

110

Pyramid/triangle filter

Figure 8c

SYSTEM AND METHOD FOR RAPIDLY SCALING AND FILTERING VIDEO DATA

CROSS-REFERENCE TO RELATED APPLICATIONS

The present application claims priority under 35 U.S.C. § 119(e) to U.S. Provisional patent application entitled "Video Processing System and Method" filed on May 7, 2004, having Ser. No. 60/568,892, which is incorporated by reference in its entirety.

BACKGROUND OF THE INVENTION

1. Field of the Invention

This invention relates generally to a system for scaling and filtering video data and more specifically to methods and techniques for accelerating scaling and filtering operations on digital video.

2. Description of the Related Art

Manipulation of video data, including scaling and filtering pixels, can be time-consuming. Digital video is made up of many megabytes of pixel data per second of video. Uncompressed, high-definition video taxes even the fastest computer systems due to large image sizes and fast frame rates.

In a system designed to manipulate digital video data, there are many operations that would be valuable if they could be performed on a video data stream. For instance, someone watching a digital video stream might want to scale the video up to fill the screen, or scale the video down to occupy only a corner of the full screen, displaying it as a video thumbnail.

Scaling requires the creation of new video pixels based on existing pixel data. Video consists of a series of frames or images, so in order to scale video; the individual images must each be scaled. When an image is scaled, the value of the new pixel in the scaled image is based on the values of one or more existing pixels in the original image. There are many different ways to calculate the value of the new pixel. Typically the new pixel value is based on the values of one or more original pixels that are in the neighborhood of the new pixel. In any case, the pixel value calculation can be formulated as a linear equation that depends on many original pixels. The difference between the different scaling calculations is ultimately just a difference in the coefficients of the linear equation.

Someone editing or composing a new video stream out of several video clips might desire to modify individual clips. For instance, certain video effects might be used in the clips, like eliminating the color to make a clip black & white, scaling or blurring the video, or adding some other effect or filter.

Filtering operations are similar to scaling operations in that a new pixel value is based on one or more original pixel values. Different filters cause the new image to appear as a blurred version of the original image. Another filter might sharpen the image by enhancing the edges that appear in the image data. Contrast and brightness can be adjusted using filtering operations, as well as changes in color saturation.

As in all computer systems, when editing video, the faster the video system can process the video stream, the easier it is to edit the video. Delays introduced while waiting for filtering or scaling operations to be performed slows down the editing process. Scaling of a video to fit a certain size is most useful when it can be done at actual video speeds or faster. When the scaling operation happens at slower than video speeds, it is virtually useless because the video can't be viewed on a computer until after the entire video is scaled to fit the screen.

Prior art solutions exist which provide video scaling and filtering in real time. Existing solutions provide scaling and filtering operations as separate operations on the same processor chip or separate chips. Separate operations require additional buffers, increasing both the die size and the energy requirements of the chip, as well as potentially impacting the operational speed. However, it does allow the scaling operation to be performed in parallel by the other hardware during the same time period. Such an approach provides improvements in the time required to scale and filter the image. Alternatively, existing prior art systems might reduce hardware logic requirements by using one set of logic gates for performing both filtering and scaling, but performing those operations in series instead of parallel. However, while such series calculations reduce hardware, they increase the time required to perform both operations.

What is needed is a system that provides the scaling and filtering operations simultaneously on video data streams. What is further needed is a reduction in the size and power requirements of the video manipulation hardware by allowing logic hardware and memory buffers to be shared between different functions in the system.

SUMMARY OF THE INVENTION

According to the present invention, a system is provided for performing scaling and filtering operations on video data. The system in one embodiment of the present invention provides rapid scaling and filtering operations in a way that is efficient and minimizes memory and logic gates. Logic is shared where possible between filtering and scaling operations. In one embodiment of the present invention, video is scaled up in size using shared resources. Scaling and filtering in a pipeline minimize memory buffer size; in other words, data from one operation is used immediately in the next operation where possible and in some cases operations can be combined. The system preferably comprises an input buffer, a scan conversion unit, a horizontal upscaling/filtering module, a horizontal downscaling module, a coefficient unit, an intermediate buffer, a vertical upscaling/filter module, and a vertical downscaling module.

The present invention advantageously takes two operations, for instance both a scaling and filtering operation, and combines the linear equations describing those operations into a single linear equation. Scaling, of course, requires not just a linear equation, but also a way to map the pixels in the original neighborhood to the new pixels in the image at the new resolution. However, the actual calculation of the new pixel values is still done using a linear equation and this can be combined with the filter linear equation coefficients. Thus by running the scaling operation using specially calculated coefficients, it is possible to both scale and brighten a series of images that make up a video stream.

The present invention takes advantage of the possibility of creating coefficients that perform both scaling and filtering operations simultaneously, by creating a system that utilizes programmable or modifiable coefficients in the scaling operation. By carefully selecting the coefficients used in the scaling operation at run-time, the scaled image will also have been modified as if by a filtering operation. In other words, when the end user requests that a series of video images be scaled and filtered, the coefficients can be set so that both the scaling and filtering operation happen simultaneously. This technique, in one embodiment of the invention, eliminates the need for additional logic gates for a separate filtering operation and reduces the need for an additional buffer to store intermediate results of one operation before performing the second operation.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

FIGS. 8a, 8b, and 8c are example filter coefficients for several types of filtering which might be used in the system shown in FIG. 1, according to one embodiment of the present invention.

DETAILED DESCRIPTION OF THE EMBODIMENTS

Figure 1:
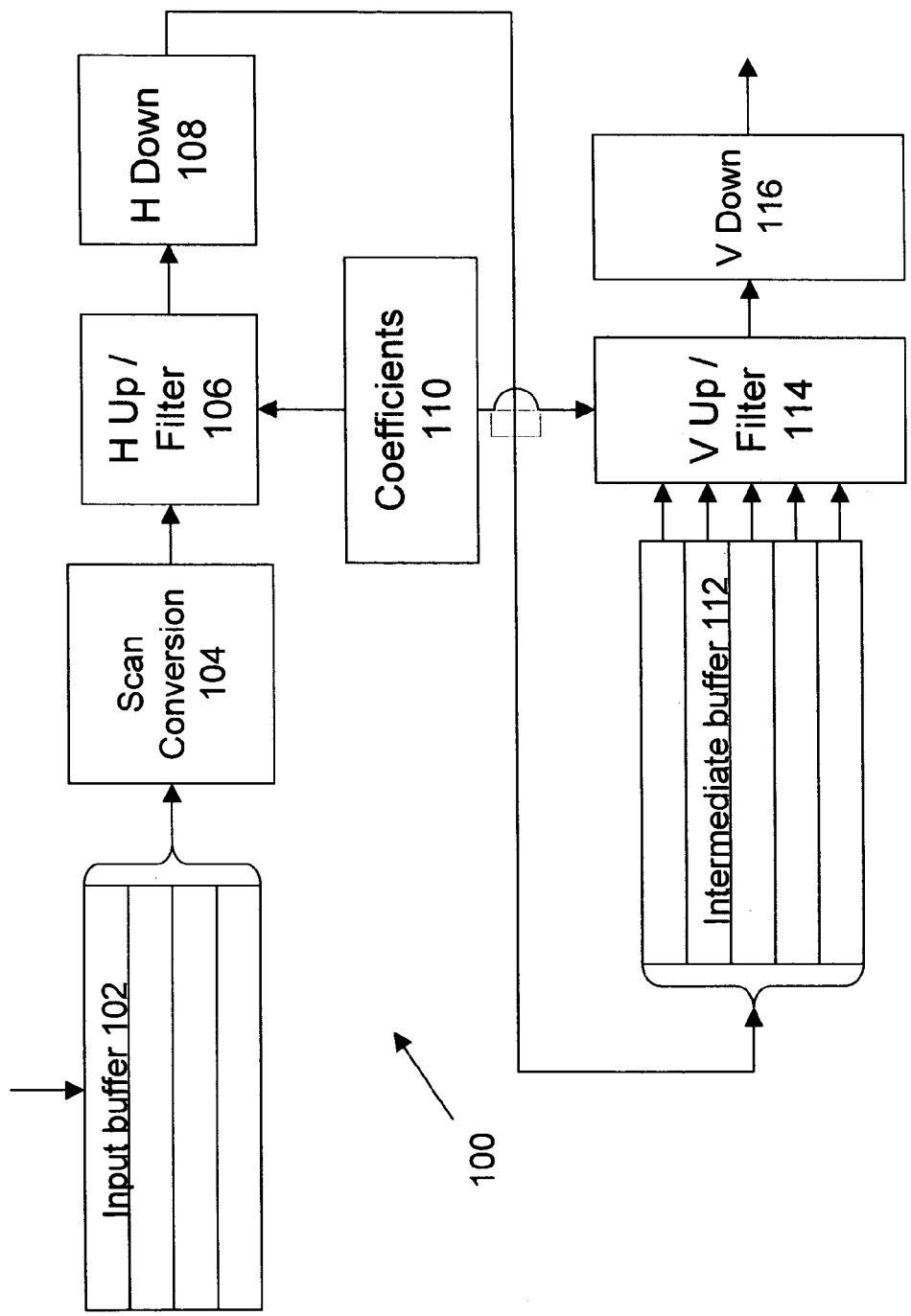
FIG. 1 is a block diagram illustrating an architecture of a system for accelerating the scaling and filtering of video data, according to one embodiment of the present invention.

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

This present invention will now be described in terms of N:M scaling. In other words, when an image is to be scaled by a ratio which can be represented by a pair of integers. For instance, a downscaling of ½ is represented by 2:1. An upscaling by a factor of 33% can be represented by a ratio of 3:4. Those skilled in the art will recognize that the present invention is applicable to any ratio of scaling video images that may be desirable.

In this application, the following terms are used:

"Pixel" refers to an individual picture element in an image that may be part of a video stream. An image is made up of many pixels organized into rows and columns. Each pixel independently represents a color and luminosity or brightness that may be different than all surrounding pixels in the image. Subsequent images in the video stream have pixels at the same location that are independent from the pixel in the current image.

"Frame" refers to a single image in a digital video stream. Many digital video streams have 30 frames per second or 30 individual images that make up one second of video.

"Resolution" refers to the number of pixels in the rows and columns of the image. For instance, it may be said that the resolution of a high-definition television (HDTV) frame is 1920×1080 pixels, meaning that there are 1920 columns of pixels and 1080 rows of pixels in a single frame of an HDTV video.

The term "coefficient" refers to one of the numbers multiplied by the original pixels when calculating the values of new pixels in a new filtered or scaled image.

"Filter" refers to a set of coefficients and a way of applying those coefficients to the original pixels in a video frame in order to create a new modified video frame.

"Buffer" refers to a storage mechanism whether on an integrated circuit or a defined portion of memory where intermediate values are stored in a calculation. When multiple calculations are performed on data in sequence, intermediate values are stored in a buffer while waiting for one calculation to finish and the next calculation to proceed.

"Scale" or "scaling" refers to the process of changing the resolution of an image or making an image or video frame larger or smaller than its original resolution. Converting a video from NTSC (640×480) resolution to HDTV (1920×1080) resolution is an example of "scaling" the video or more specifically, up-scaling. An example of downscaling would be converting from HDTV to NTSC.

A "line" of video refers to a single row of image pixels from a single frame of a video.

Referring now to FIG. 1, there is shown a block diagram of one embodiment of the system 100 of the present invention. The system 100 represents hardware for converting video pixel data, in particular, for scaling and filtering data. The system 100 preferably comprises: an input buffer 102, a scan conversion unit 104, a horizontal upscaling/filtering module 106, a horizontal downscaling module 108, a coefficient unit 110, an intermediate buffer 112, a vertical upscaling/filter module 114, and a vertical downscaling module 116.

The input buffer 102 has an input and an output and is used to store video data before processing. The input of the input buffer 102 is coupled to other systems (not shown) to receive video data. The input buffer 102 is preferably a 4-line buffer for storing four lines of video data at the highest resolution of frame the system 100 is capable of processing. The output of the input buffer 102 is coupled to the input of the scan conversion unit 104.

The scan conversion unit 104 is a conventional type and converts the video data into pixel data. The scan conversion unit 104 has an input and an output. The input is coupled to the output of the input buffer 102 and the output of the scan conversion unit 104 is coupled to the horizontal upscaling/filtering module 106. The input buffer 102 and the scan conversion unit 104 prepare the video data for the scaling and filtering.

The horizontal upscaling/filtering module 106 is used when either an increase in video resolution or some filtering operation is performed on the image. The upscaling and filtering are controlled by coefficients provided by the coefficients unit 110. The horizontal upscaling/filtering module 106 has a data input coupled to the output of the scan conversion unit 104, a control input coupled to the coefficient unit 110 and an output coupled to the horizontal downscaling module 108. In one embodiment, the horizontal upscaling/filtering module 106 implements a 9-tap filter that will be familiar to those skilled in the art. The coefficients, provided by the coefficient unit 110, of the 9-tap filter can be modified as needed by other parts of the hardware (not shown), by programs or by the end user to achieve a specific effect through scaling and filtering using the horizontal upscaling/filtering module 106. In instances when no filtering and no horizontal upscaling is performed, the horizontal upscaling/filtering module 106 merely passed the data through, unchanged.

The coefficients unit 110 is preferably one or more data storage locations, registers or memory locations that are accessed by the horizontal upscaling/filtering module 106 to retrieve coefficients used by the horizontal upscaling/filtering module 106 to modify the input video data as will be discussed in more detail below. These data storage locations can be accessed by other hardware and software devices (not shown) to load coefficients that will provide the desired filtering and or scaling.

The output of the horizontal upscaling/filtering module 106 is coupled to the input of the horizontal downscaling module 108. The horizontal downscaling module 108 is responsible for decreasing the size of the video image when requested. The horizontal downscaling module 108 performs downscaling using any one of a number of conventional techniques in addition to the techniques disclosed below with reference to FIGS. 5 and 6. When no downscaling is performed, the horizontal downscaling module 108 passes the data through unchanged. The output of horizontal downscaling module 108 is stored in the intermediate buffer 112.

The intermediate buffer 112 is positioned between the vertical scaling and filtering operations and the horizontal filtering and scaling operations. Preferably, the intermediate buffer 112 is a 5-line buffer. The intermediate buffer 112 has a plurality of outputs, such as five, one for each line, to provide data the vertical upscaling/filter module 114. While only shown as a five line, line buffer, the intermediate buffer 112 could have any plurality of lines as will be understood by those skilled in the art. The output of the intermediate buffer 112 is coupled to the inputs of the vertical upscaling/filter module 114.

The vertical upscaling/filter module 114 uses a 5-tap filter familiar to those skilled in the art of image processing to create the new pixel values for the scaled and filtered video frames. The vertical upscaling and filtering performed by the present invention will be disclosed in more detail below. The vertical upscaling/filter module 114 uses coefficients received from the coefficients unit 110. Hardware, programs, or the end user can modify the coefficient values stored in the coefficients unit 110. The output of the vertical upscaling/filter module 114 is coupled to the input of the vertical downscaling module 116.

Finally, the vertical downscaling module 116 completes the processing of the video frame data before sending the data to other systems (not shown). Vertical down scaling may be performed in a conventional manner as will be understood to those skilled in the art in addition to method similar to those disclosed below with reference to FIGS. 5 and 6, but for vertical downscaling.

Horizontal upscaling and horizontal downscaling are not performed on the same data. However, upscaling and filtering might be performed on the same data and filtering and downscaling might be performed on the same video frame. For this reason, modules 106 and 108 are both used but not to scale up and down the same data. Similarly modules 114 and 116 are both used but not to scale up and down the same data.

Figure 2A:
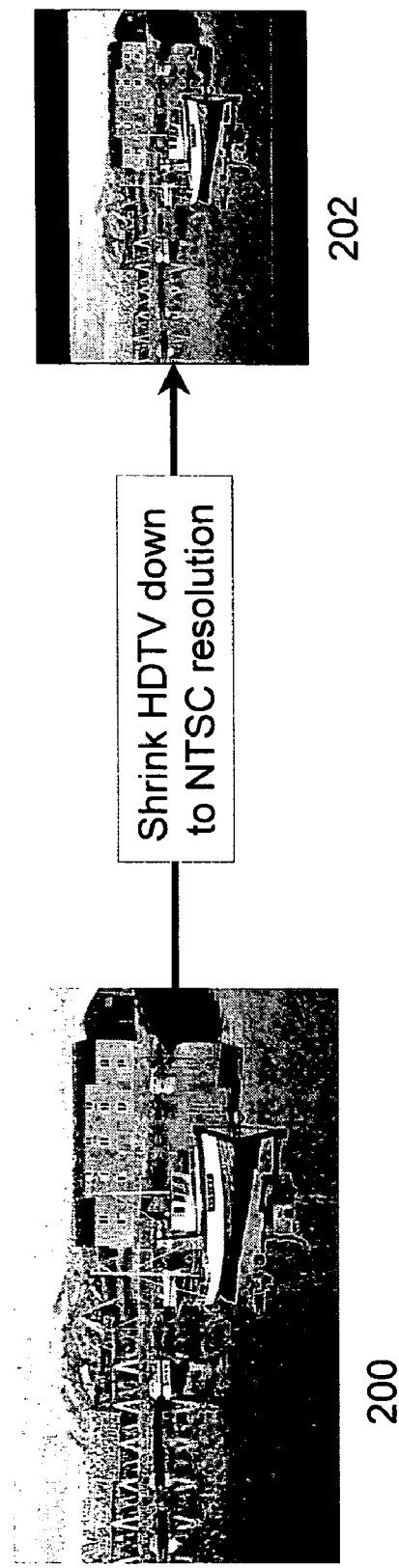
FIGS. 2a, 2b, and 2c are examples of the types of video pixel operations that can be performed using the system shown in FIG. 1, according to one embodiment of the present invention.
Figure 2B:
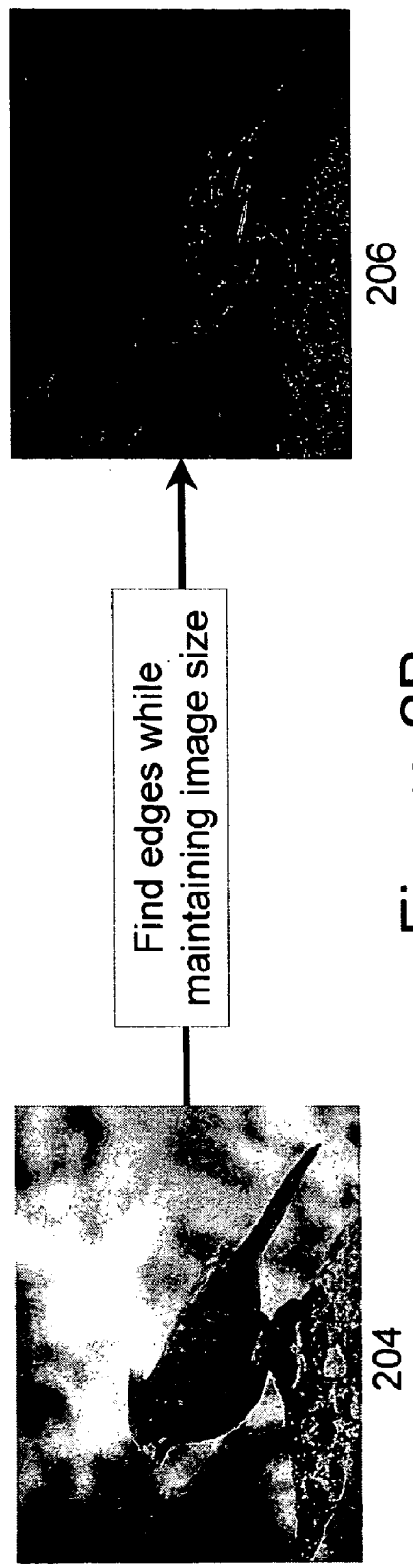
Figure 2C:
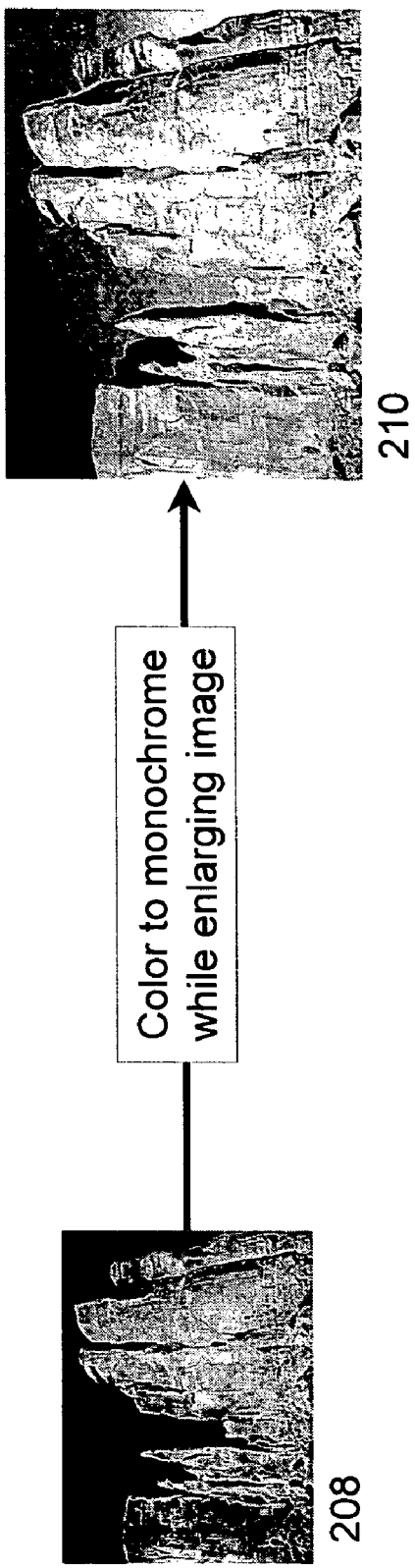

FIGS. 2a, 2b, and 2c show some examples of types of operations that might be performed on video data.

FIG. 2a shows an example of changing the resolution of a video image by downscaling a high-resolution television video frame (1920×1080) 200 down to NTSC resolution (640×480) 202 while maintaining the aspect ratio of the original image data. This type of operation is used extensively when displaying HDTV resolution video on standard television monitors.

FIG. 2b shows a frame of video that maintains its resolution, but undergoes a filtering operation. The original image of the cardinal 204 is filtered using an edge finding filter, the results of which are shown in image 206. Edge finding filters are used for special effects and are similar to edge sharpening filters.

FIG. 2c shows a frame of video 208 that is enlarged and converted to a monochrome image 210. Enlarging a video is necessary when the viewer wishes to view an NTSC resolution (640×480) video on a standard computer monitor (1280×1024). Monochrome videos might be created as a special effect.

Filters can be represented as linear equations operating on the pixels of an original image. The value of each new pixel is calculated to be some weighted combination of the values of the original pixels in the neighborhood of the new pixel. This is well understood in the art of image processing and details can be found in any image processing book. Images are often filtered using two-dimensional filters, but each row of an image can be filtered separately using one dimensional filters as is done in one embodiment of this invention.

Figure 3:
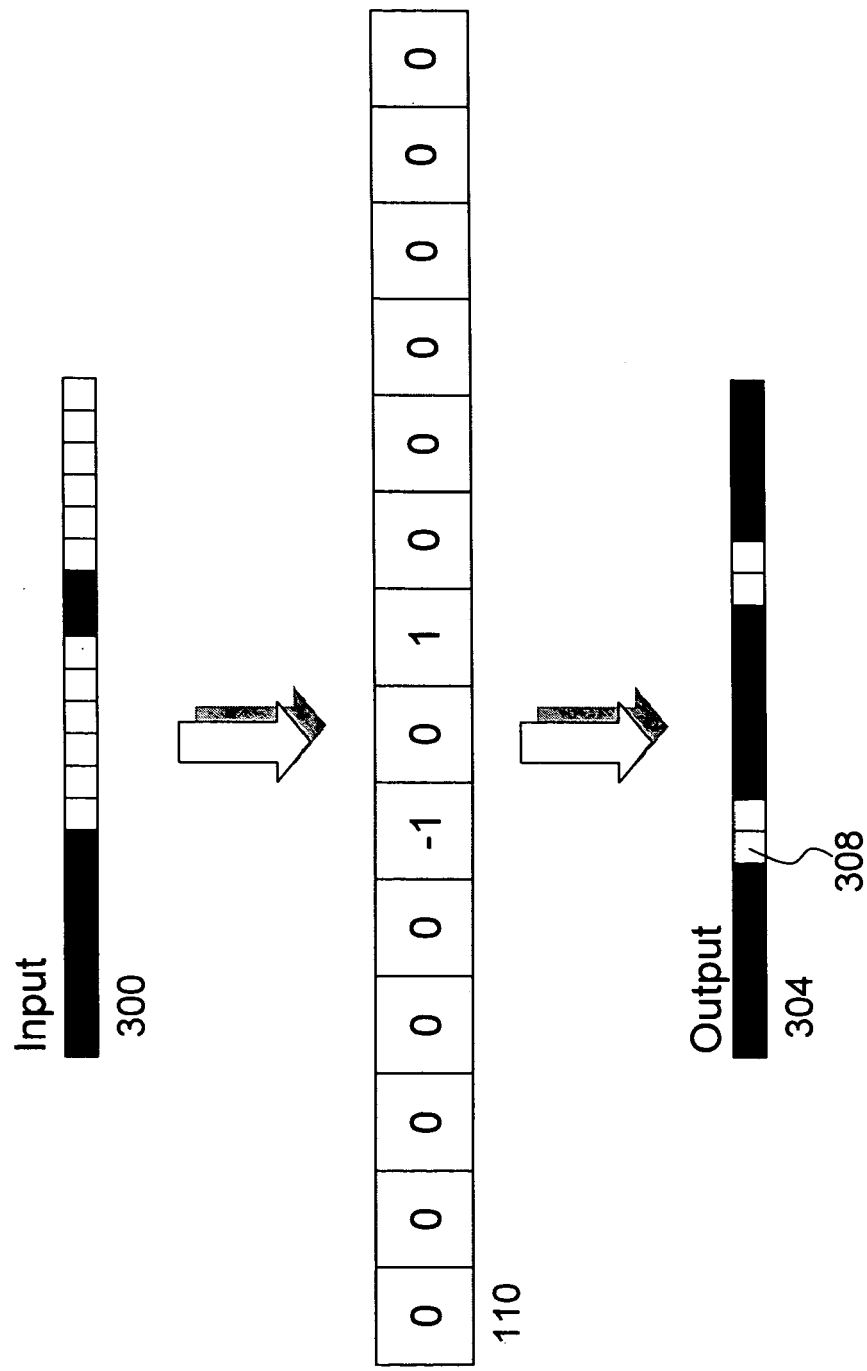
FIG. 3 is a block diagram depicting an exemplary filtering operation that can be performed using the system of FIG. 1, according to one embodiment of the present invention.

FIG. 3 shows a block diagram of a filter operation. The filter shown is a vertical edge finding filter. The input in this case consists of a series of pixels that are shown here as black or white pixels. For this example, black pixels could be considered to have a value of 0 and white pixels as having values of 256 (0×FF in hexadecimal)—typical in imaging systems. The value of the output pixels 304 is based on the values of the input pixels 300 convolved with the coefficients 110. For instance, looking at the $7^{th}$ pixel 308 in the output row 304, the value is 256 which corresponds to $(-1*0)+(0*0)+(1*256)$. A value of 256 only occurs when the value of two nearby input pixels 300 are different. The linear equation that represents this filter is $$P_{Out} = [-1\ 0\ 1] \begin{vmatrix} P_{i-1} \\ P_i \\ P_{i+1} \end{vmatrix}$$

where $P_{out}$ represents the value of the new pixel and $P_{i-1}$, $P_i$, and $P_{i+1}$ represent the values of the input pixels 300.

Figure 4:
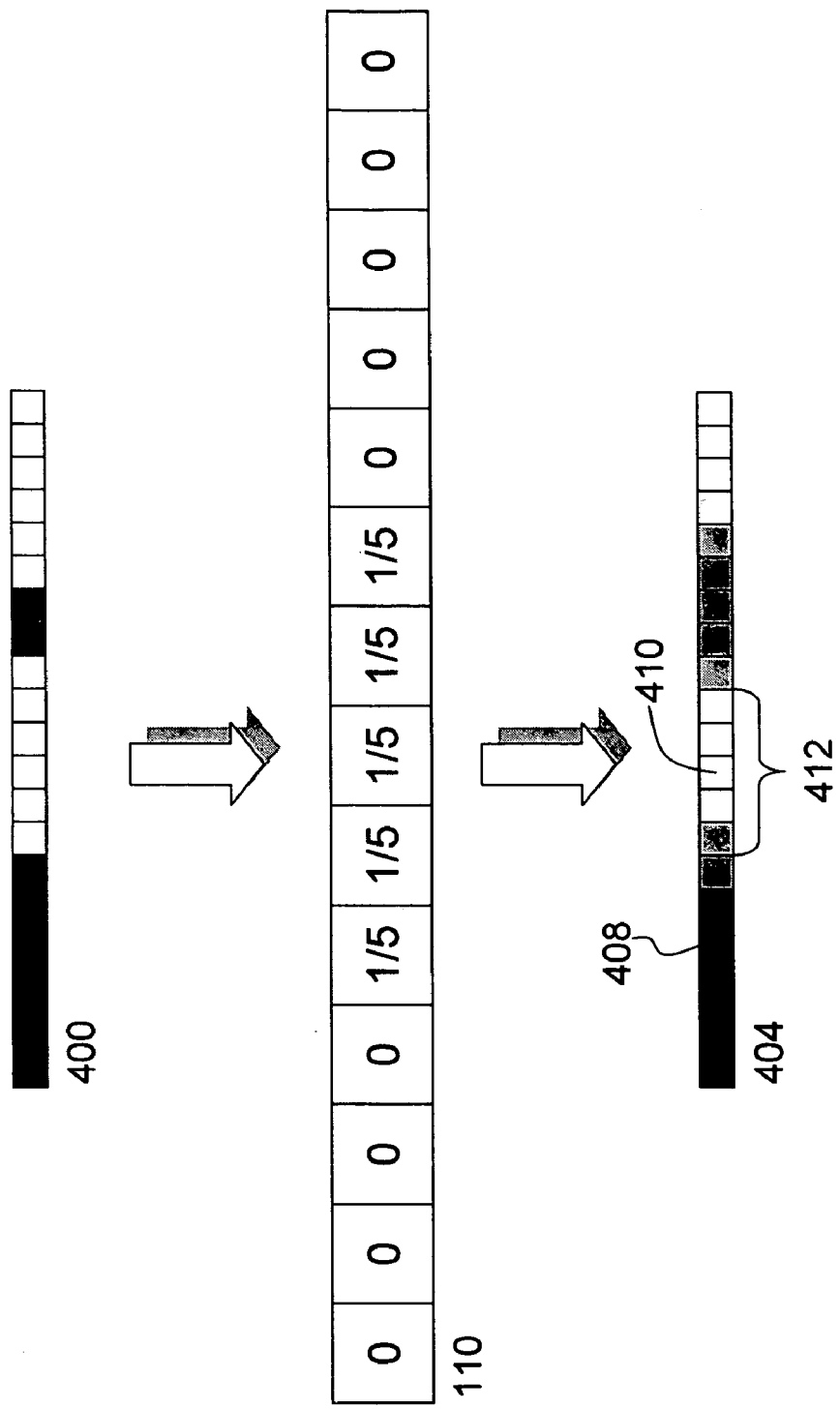
FIG. 4 is a block diagram depicting a second exemplary filtering operation that can be performed using the system shown in FIG. 1, according to one embodiment of the present invention.

FIG. 4 represents a box filter in the coefficients 110. Output pixel values are based on an average value of the 5 surrounding pixels. This is one type of blurring filter where the output appears to be a blurred version of the input. Notice that the $5^{th}$ pixel 408 from the left in the output row 404 is all dark, representing a value of 0 which is the average of the $3^{rd}$ through $7^{th}$ pixels on the left in input row 400. Moving now to the $10^{th}$ pixel 410 in the output row 404, the value is 256 or all white, which is also the average of the $8^{th}$ through $12^{th}$ pixels 412 in the input row 400. Pixels in between the $5^{th}$ and $10^{th}$ pixels on row 404 gradually get lighter because the input pixels in row 400 change from black (0) to white (256) and therefore the average slowly increases until the pixel is white in the $10^{th}$ pixel. The linear equation below representing the box filter coefficients 110.

$$P_{Out} = \frac{1}{5}[1\ 1\ 1\ 1\ 1] \begin{vmatrix} P_{i-2} \\ P_{i-1} \\ P_i \\ P_{i+1} \\ P_{i+2} \end{vmatrix}$$

These are simplified examples that are used to show how different filters are implemented and how a change in coefficients can change the output image. Those skilled in the art will understand that the actual implementation is more complex than the example shown here and this example is brief to emphasize that fact that many filters can be implemented using the same hardware but by storing different coefficients in coefficient unit 110.

Figure 5:
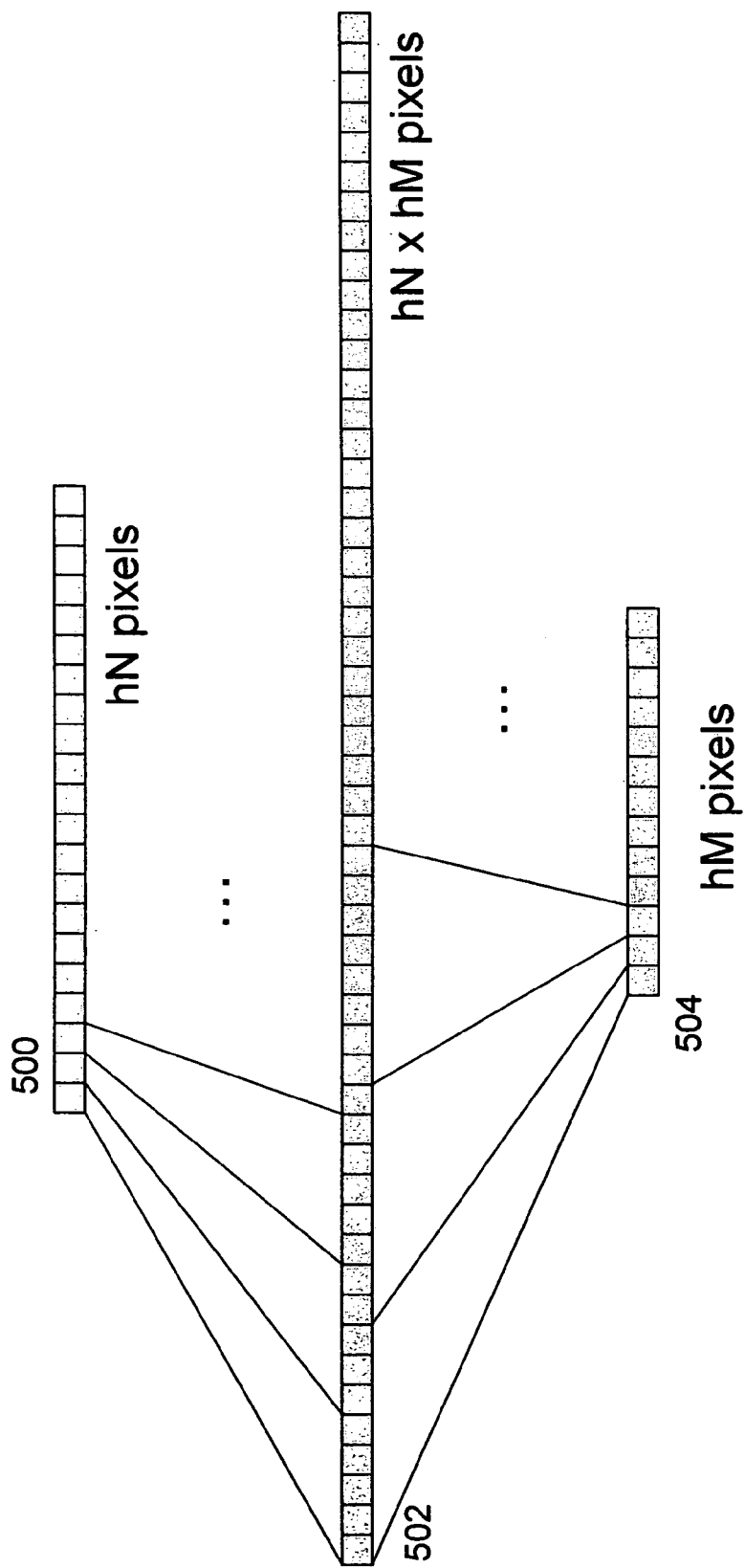
FIG. 5 is a depiction of a downscaling operation according to one embodiment of the present invention.

FIG. 5 shows a representation of down scaling using an hN:hM ratio. Starting with hN pixels in the row 500, hN×hM pixels 502 are created. Every group of hN pixels in row 502 have the same value as one pixel from original row 500. Then, each pixel in row 504 is calculated to be the average of hM pixels in the hN×hM row 502. This is a very simple and efficient method of downscaling an image where hN>hM.

Figure 6:
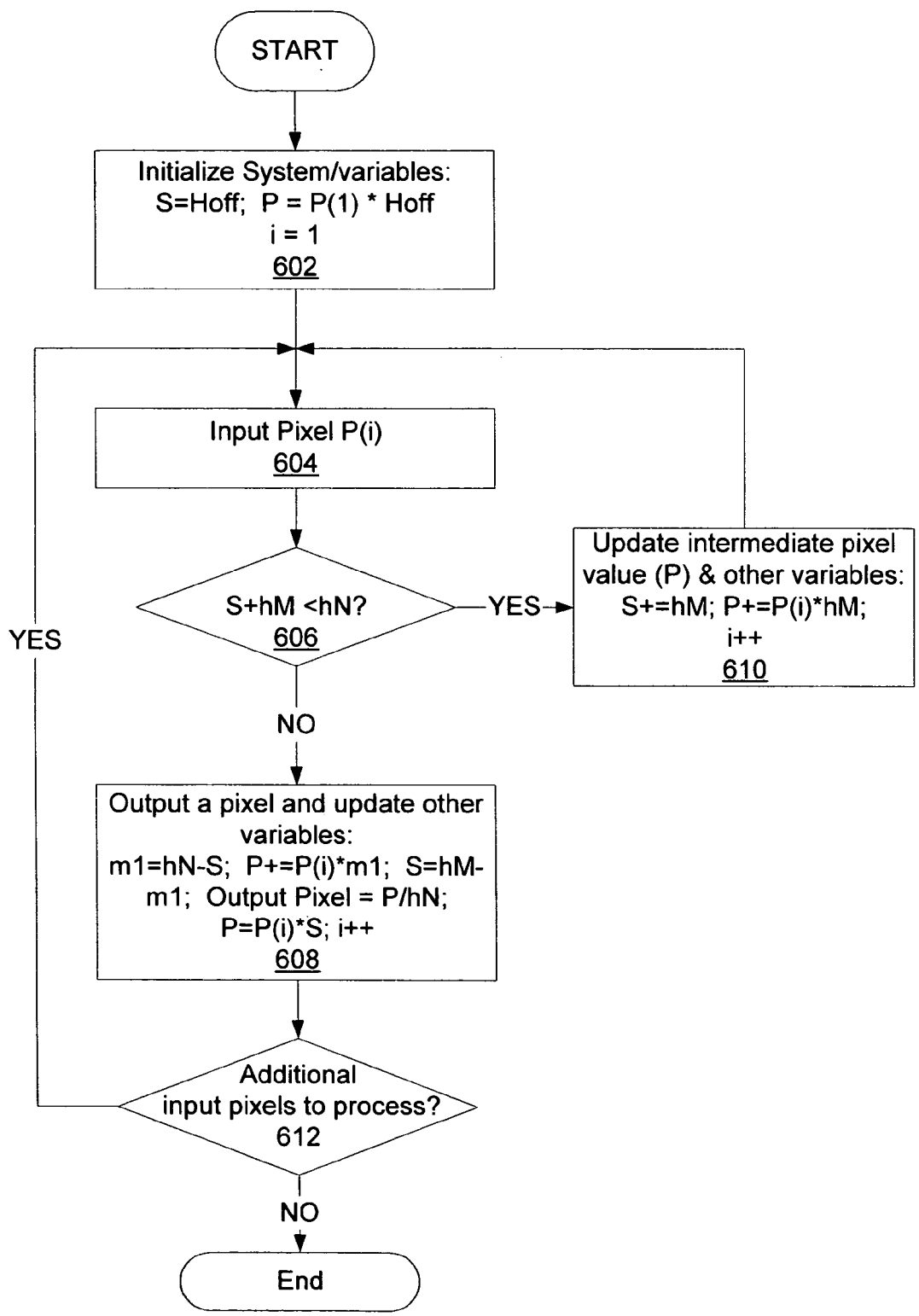
FIG. 6 is a flow diagram showing a downscaling operation according to one embodiment of the present invention.

FIG. 6 shows a flow chart of the preferred method for operation of the horizontal downscaling module 108. The method of the present invention may advantageously also be used for the vertical e operations by modifying values of S, P, hM, and hN accordingly. While the present invention will now be described for the process of horizontal downscaling, those skilled in the art will recognize how the method of the present invention may be modified and used for vertical down scaling and the vertical downscaling module 116.

FIG. 6 shows a flow chart of the preferred method for operation of the horizontal downscaling module 108. This represents the same algorithm that is diagrammatically shown in FIG. 5. As shown in FIG. 5, an hN×hM size buffer was required by the prior art the intermediate step, but using the method of the present invention shown in FIG. 6, no such buffer is necessary.

The initialization of the process starts 602 where a value S is initialized to the horizontal offset value Hoff which is related to the phase shift in the UV channel. The horizontal offset value Hoff is always less than hN, the number of pixels in the input row. A temporary output pixel value P is created based on the first pixel in the input row 500. 'i' is a variable used for iterating along the original pixel row 500.

Next at step 604, the pixel at 'i', input P(i), is read from row 500. At step 606, the method tests if the value of S+hM is less than hN. If the value of S+hM is less than hN, flow goes to module 610 where the value of S is increased by hM, the output pixel value P is increased by hM multiplied by the input pixel and i is increased by 1. In this case, no new output pixel is saved. An intermediate value is of P is created.

If at step 606, the method determined that the value of S+hM is greater than or equal hN, the process continues in step 608 where several values are calculated. A temporary variable m1 is calculated to equal hN−S. The output pixel value P is increased by the newly read original pixel value multiplied by m1. A new value of S is calculated as hM−m1. The output pixel value is calculated to be P divided by hN and the output pixel value is saved. The output pixel value P is then set to the current input pixel value multiplied by S and the variable i is increased by 1.

After completion of step 608, the method determines 612 if there are more pixels in the row to process. If so the method returns to step 604 and continues. Otherwise, the method is complete and ends. At the time that no more pixels are available from the input row 500, all of the output pixels have been written with their correct values and downscaling is complete. This downscaling algorithm requires only a few registers of storage for the calculation as opposed to the hM×hN row of pixel values shown in FIG. 5 and still performs the same calculation.

Figure 7:
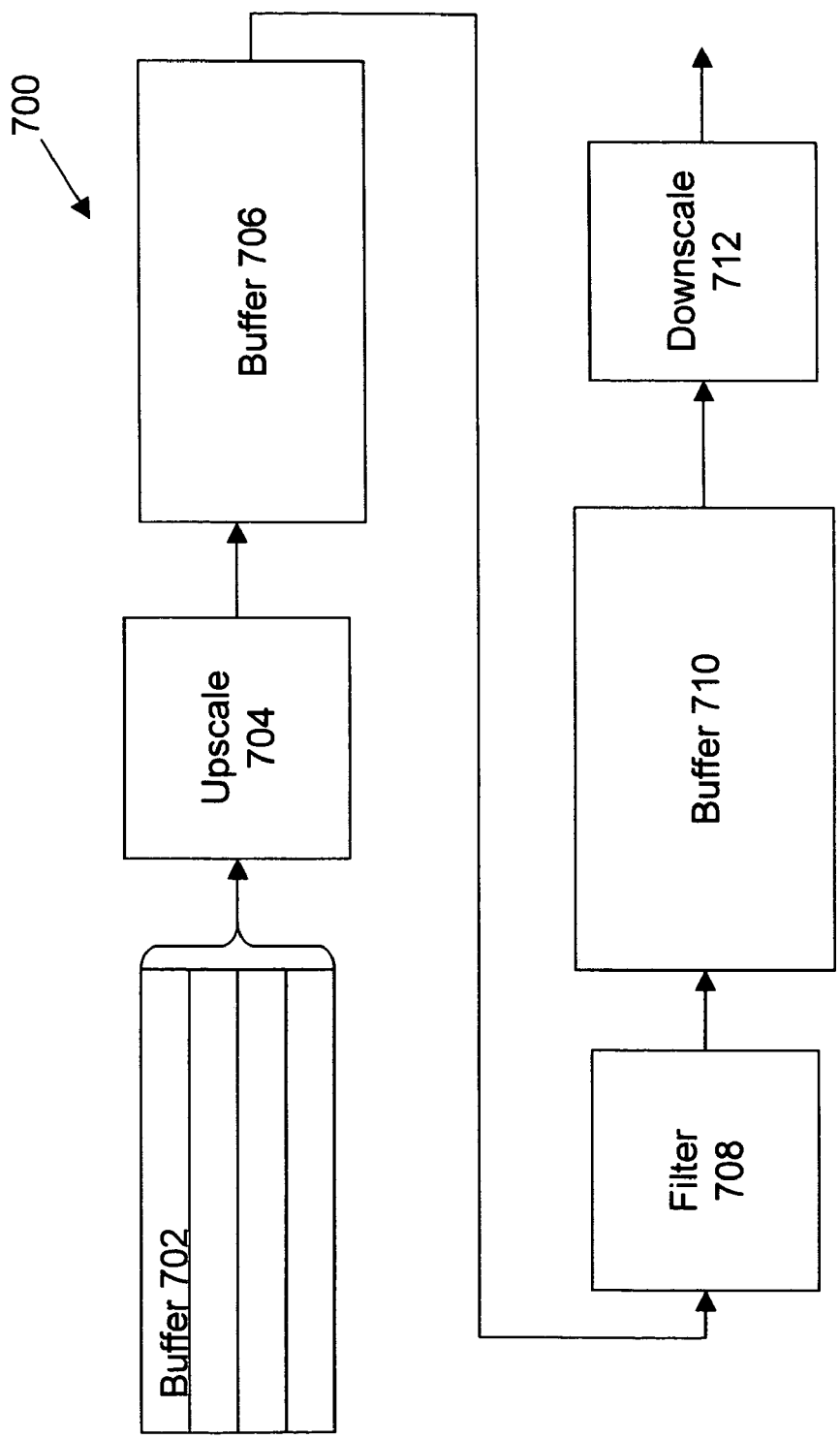
FIG. 7 is a block diagram depicting a system for scaling and filtering digital video data according to the prior art.

FIG. 7 shows an example of an existing prior art system 700 where there are multiple buffers and separate scaling and filtering modules. In such an existing system, the video data is stored in a buffer 702 preparatory to it being operated on by the scaling and filtering modules. Upscaling 704 is performed independently filtering and so the results of the upscaling are stored in buffer 706. Filtering is then applied at 708 to the results of the upscaling and those results are stored in buffer 710. Finally, if any downscaling is to be performed, it occurs at module 712 and then the results are sent on to the rest of the hardware outside of 700. As compared to FIG. 1, two additional buffers 706 and 710 are required in the hardware implementation as well as an additional logic module 708.

FIG. 8a, 8b, and 8c show several examples of coefficients 110 that could be used for filtering. FIG. 8a shows the edge finder filter that used in FIG. 3. FIG. 8b shows the box filter used in FIG. 4 and FIG. 8c shows a pyramid or triangle filter, which is also used for blurring, with results similar to the box filter.

By providing programmable coefficient memory 110, logic gates can be shared between the upscaling and filtering functions and extra memory buffers are eliminated, allowing the creation of a smaller, more efficient hardware design for video data manipulation.

Figure 9:
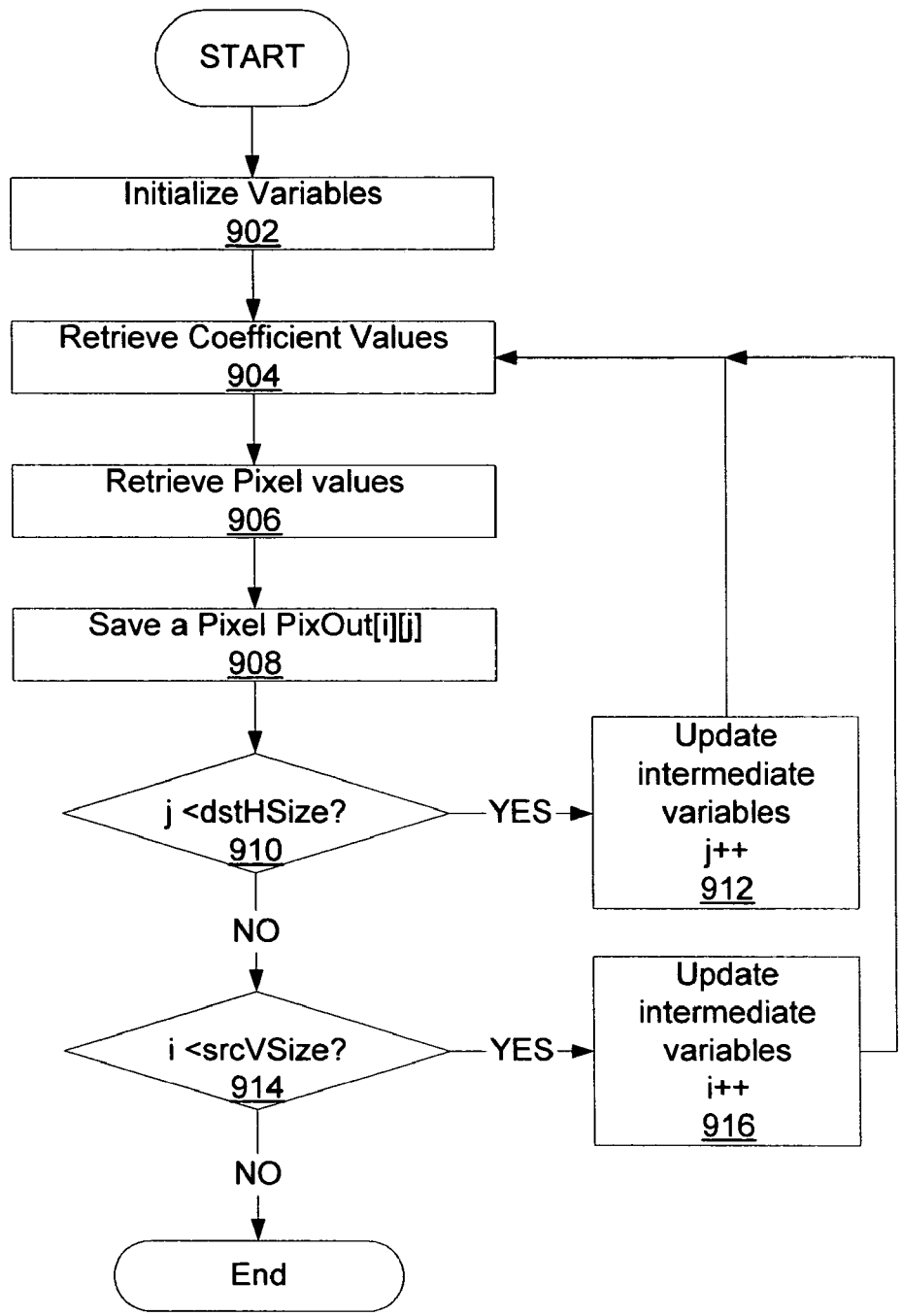
FIG. 9 depicts a method for performing horizontal upscaling and filtering at the same time or only filtering without any horizontal upscalling.

Referring now to FIG. 9, a method for performing horizontal upscaling and filtering at the same time or only filtering without any horizontal upscaling is shown. The method for upscaling and filtering is accomplished by storing a set of coefficient that when used with the method will provide pixel values that are both filtered and upscaled. Each coefficient preferably has 8 bits and is stored in a coefficient table (not shown). The method will also be described with specific a more specific algorithm and variable values provided in Appendix A.

The method begins in step 902 by initializing the variable and other parameter to beginning values. An exemplary set of variables and values are provided below in Appendix A. Next, the coefficient values are retrieved 904 or accessed from a table. Then in step 906, input pixel values, Pij are retrieved. Next, the method determines a new pixel output value to be saved or output. This preferably done by multiplying the values of surrounding pixels by the coefficients. An exemplary formula for the output pixel value is provided in Appendix A. Those skilled in the art will recognize that by modifying the coefficient values of this formula accordingly, the filter and scaling may be modified as desired for the use of other filters and, scaling to any degree. After step 908, the method proceeds to step 910 to determine if there are additional pixels in the row to be generated, as represented by variable j. If there are additional pixels to be generated as indicated by j being less than the destination horizontal size, then the method continues in step 912. In step 912 the value of j is incremented to generate the next pixel and any intermediate variables are update such as those described in Appendix A. After step 912, the process returns to step 904, and repeats steps 906 and 908 for the new value of j. If at step 910, j is greater than or equal to the destination horizontal size, then method proceeds to step 914 where the vertical value is compared to the vertical size of the image. If i, the vertical pixel value, is less than the vertical size of the image the process proceeds to step 916 to update intermediate values and increment the value of i to loop through value of i from 0 to the source vertical size. Exemplary values are variables are disclosed below in Appendix A. After step 916, the process returns to step 904, and repeats steps 906 and 908 and the inner loop for the new value of i. On the other hand, if the value of i is greater than or equal to the vertical size of the image the method is complete and ends.

The method for vertical scaling and filtering is similar to that described above for horizontal scaling and filtering. Also in accordance with the present invention, vertical scaling and filtering occurs simultaneously. Also, by setting the variables and coefficients for scaling appropriately, this method can perform no scaling and filtering only. Those skilled in the art will recognize how simultaneous filtering and scaling can be done with the method described above modified for vertical scaling and using the algorithm for vertical scaling set forth in Appendix A.

The above description is included to illustrate the operation of the preferred embodiments and is not meant to limit the scope of the invention. For example, the present invention was described in terms of 5-tap filter, however, those skilled in the art will recognize that the invention may be used with a variety of other filter and scaling types. The scope of the invention is to be limited by only the following claims. From the above discussion, many variations will be apparent to one skilled in the relevant art that would yet to be encompassed by the spirit and scope of the invention.

APPENDIX A

Algorithm for Horizontal Up Scaling/Filtering

1. Scaling mode: HScaleEn=1 and hM>hN. In this mode, the image will be scaled up. A filter can also be applied.
2. Initialize Variables
   HCoeff[9][64]: coefficients table. Each coefficient has 8 bits.
   dstHSize=srcHSize*hM/hN
   HOFF: horizontal offset
   OddSPH: 1: the horizontal scaling is using odd number of samples 0 even number of samples
3. Save the pixel value according to the following equation by iterating over i and j to calculate pixel values for 0<=i<srcVSize, 0<=j<dstHSize
   PixOut[i][j]=(PixIn[i][jm4]*HCoeff[0][coeffIdx]+PixIn[i][jm3]*HCoeff[1][coeffIdx]+PixIn[i][jm2]*HCoeff[1][coeffIdx]+PixIn[i][jm1]*HCoeff[3][coeffIdx]+PixIn[i][j0]*HCoeff[4]+PixIn[i][jp1]*HCoeff[5][coeffIdx]+PixIn[i][jp2]*HCoeff[6][coeffIdx]+PixIn[i][jp3]*HCoeff[7][coeffIdx]+PixIn[i][jp4]*HCoeff[8][coeffIdx]+128)/8
4. Variables such as below are updated.
   j0=(HOFF+j*hN+(OddSPH?hM/2:0))/hM;
   jmx=j0−x;
   jpx=j0+x;
   if jx<0
   PixIn[i][jx]=PixIn[i][0];
   If jx>=srcHSize
   PixIn[i][jx]=PixIn[i][srcHSize-1]
   CoeffIdx=j % hM;

Algorithm for Horizontal Filtering, No upscaling

1. Filtering mode: HScaleEn=0 and HFiterEn=1 Same algorithm as horizontal upscaling, but HOFF=0, hN=hM=1;

Algorithm for Vertical Up Scaling/Filtering

1. Scaling mode: VScaleEn=1 and vM>vN. In this mode, the image will be scaled up. A filter can also be applied.
2. Initialize Variables
   VCoeff[5][64]: coefficients table. Each coefficient has 8 bits.
   dstVSize=srcVSize*vM/vN
   VOFF: Vertical offset
   OddSPV: 1: the vertical scaling is using odd number of samples 0: even number of samples
3. Save the pixel value according to the following equation by iterating over i and j to calculate pixel values for 0<=j<dstHSize, 0<=i<dstVSize
   PixOut[i][j]=(PixIn[im2][j]*HCoeff[0][coeffIdx]+PixIn[im1][j]*Hcoeff[1][coeffIdx]+PixIn[i0][j]*HCoeff[2]+PixIn[ip1][j]*HCoeff[3][coeffIdx]+PixIn[ip2][j]*HCoeff[4][coeffIdx]+128)/8
4. Variables such as below are updated.
   i0=(VOFF+i*vN+(OddSPV?vM/2:0))/vM;
   imx=i0−x;
   ipx=i0+x;
   if ix<0
   PixIn[ix][j]=PixIn[0][j];
   If ix>=srcVSize
   PixIn[ix][j]=PixIn[srcVSize-1][j]
   CoeffIdx=i % vM;

Algorithm for Vertical Filtering, No Upscaling

1. Filtering mode: VScaleEn=0 and VFiterEn=1
   Same algorithm as vertical upscaling, but VOFF=0, vN=vM=1;

Configuration Registers hM[7:0], hN[7:0]: horizontal scaling ratio=hM:hN default 1:1
vM[7:0], vN[7:0]: vertical scaling ratio=vM:vN default 1:1
srcHSize[10:0]: horizontal size before scaling default 720
srcVSize[10:0]: vertical size before scaling default 480
dstHSize[10:0]: horizontal size after scaling default 720
dstVSize[10:0]: vertical size after scaling default 480
scanMode: 1: interlace(default), 0: progressive
HOffY[7:0]: Y channel horizontal offset, 2's complement, default: 0
HOffUV[7:0]: UV channel horizontal offset, 2's complement, default: 0
VOffYT[7:0]: Y channel vertical offset for Top field, 2's complement, default: 0
VOffUVT[7:0]: UV channel vertical offset for Top field, 2's complement, default: 0
VOffYB[7:0]: Y channel vertical offset for Bottom field, 2's complement, default: 0
VoffLUVB[7:0]: UV channel vertical offset for Bottom field, 2's complement, default: 0
HScaleEn: 1: enable horizontal scaling, default=0
HFilterEn: 1: enable horizontal Filtering, default=0
VScaleEn: 1: enable horizontal scaling, default=0
VFilterEn: 1: enable horizontal Filtering, default=0
oddSPH: 1: the horizontal scaling is using odd number of samples 0: even number of samples
oddSPV: 1: the vertical scaling is using odd number of samples 0: even number of samples Down Scaler:
iNH[11:0]: x/hN=(x*(iNH[11:0]))>>12 default: 4096
iNV[11:0]: x/vN=(x*(iNV[11:0]))>>12 default: 4096

UP-Scaler:
HCoeffY[71:0][5:0]: coefficient table for horizontal Y channel (sram)
HCoeffUV[71:0][5:0]: coefficient table for horizontal UV channel (sram)
VCoeffYT[39:0][5:0]: coefficient table for vertical Y channel topfield (sram)
VCoeffUVT[39:0][5:0]: coefficient table for vertical UV channel topfield (sram)
VCoeffYB[39:0][5:0]: coefficient table for vertical Y channel bottom field (sram)
VCoeffUVB[39:0][5:0]: coefficient table for vertical UV channel bottom field (sram)

What is claimed is:

1. A system for scaling and filtering video images, the system comprising:
   a scan converter for converting video data into pixel data, the scan converter having an input and an output, the input coupled to receive a video signal;
   a memory for storing scaling and filtering coefficients, and
   a scaling and filtering module having inputs and an output for scaling and filtering the video signal using scaling and filtering coefficients, a first input of the scaling and filtering module coupled to the output of the scan converter, and a second input of the scaling and filtering module coupled to the memory for retrieving the scaling and filtering coefficients, wherein the scaling and filtering module performs horizontal upscaling scaling and filtering concurrently, and wherein the system further comprises a second scaling module for performing horizontal downscaling, the second scaling module having an input and an output, the input of the second scaling module coupled to the output of the scaling and filtering module, and a third scaling and filtering module having inputs and an output for performing vertical scaling and filtering concurrently, a first input of the third scaling and filtering module coupled to the output of the second scaling module, a second input of the third scaling and filtering module coupled to the memory to retrieve coefficients.

2. The system of claim 1 further comprising an input buffer having an input and an output for storing video data prior to processing by the system, the input of the input buffer coupled to receive a video data signal, the output of the input buffer coupled to the input of the scan converter.

3. The system of claim 1 wherein the scaling and filtering module performs horizontal scaling and filtering concurrently.

4. The system of claim 1 wherein the scaling and filtering module performs vertical scaling and filtering concurrently.

5. The system of claim 1 wherein the scaling and filtering module performs vertical upscaling scaling and filtering concurrently, and wherein the system further comprises a second scaling module for performing vertical downscaling, the second scaling module having an input and an output, the input of the second scaling module coupled to the output of the scaling and filtering module.

6. The system of claim 1 wherein the third scaling and filtering module performs vertical upscaling and filtering, and wherein the system further comprises a fourth scaling module for performing vertical downscaling, an input of the fourth scaling module coupled to the output of the third scaling and filtering module.

7. The system of claim 1, further comprising a second scaling and filtering module having inputs and an output for scaling and filtering the video signal using scaling and filtering coefficients, a first input of the second scaling and filtering module coupled to the output of the scaling and filtering module, and a second input of the second scaling and filtering module coupled to the memory for retrieving the scaling and filtering coefficients.

8. The system of claim 7, wherein the scaling and filtering module performs horizontal scaling and the second scaling and filtering module performs vertical scaling.

9. The system of claim 1 wherein the scaling and filtering module performs scaling and filtering concurrently by multiplying pixel values with coefficient values; the coefficient values predetermined to perform the scaling and filtering operation simultaneously.

* * * * *